US008861539B2

(12) United States Patent
Dong et al.

(10) Patent No.: US 8,861,539 B2
(45) Date of Patent: Oct. 14, 2014

(54) REPLICATING AND SWITCHING MULTICAST INTERNET PACKETS IN ROUTERS USING CROSSPOINT MEMORY SHARED BY OUTPUT PORTS

(75) Inventors: Ziqian Dong, Kearny, NJ (US); Roberto Rojas-Cessa, Brooklyn, NY (US)

(73) Assignee: New Jersey Institute of Technology, Newark, NJ (US)

( * ) Notice: Subject to any disclaimer, the term of this patent is extended or adjusted under 35 U.S.C. 154(b) by 806 days.

(21) Appl. No.: 12/201,604

(22) Filed: Aug. 29, 2008

(65) Prior Publication Data

US 2009/0059921 A1  Mar. 5, 2009

Related U.S. Application Data

(60) Provisional application No. 60/967,175, filed on Aug. 31, 2007.

(51) Int. Cl.
*H04L 12/28* (2006.01)
*H04L 12/933* (2013.01)
*H04L 12/931* (2013.01)
*H04L 12/861* (2013.01)

(52) U.S. Cl.
CPC .......... *H04L 49/101* (2013.01); *H04L 49/201* (2013.01); *H04L 49/90* (2013.01)
USPC ............. 370/413; 370/390; 370/412

(58) Field of Classification Search
CPC ........................................... H04L 49/90
USPC ......................... 370/390, 412, 413
See application file for complete search history.

(56) References Cited

U.S. PATENT DOCUMENTS

| | | | | |
|---|---|---|---|---|
| 5,805,589 | A * | 9/1998 | Hochschild et al. | 370/389 |
| 6,151,301 | A | 11/2000 | Holden | |
| 6,449,283 | B1 * | 9/2002 | Chao et al. | 370/461 |
| 6,667,984 | B1 * | 12/2003 | Chao et al. | 370/414 |
| 6,763,417 | B2 * | 7/2004 | Paul et al. | 710/316 |
| 6,885,669 | B2 * | 4/2005 | Konda | 370/395.1 |
| 7,269,158 | B2 * | 9/2007 | Francois et al. | 370/351 |
| 7,317,683 | B2 * | 1/2008 | Goetzinger et al. | 370/230.1 |
| 7,542,473 | B2 * | 6/2009 | Beshai | 370/395.4 |

(Continued)

FOREIGN PATENT DOCUMENTS

WO  WO 94/17617 A  8/1994

OTHER PUBLICATIONS

International Search Report and Written Opinion for PCT/US2008/074828 mailed Dec. 12, 2008.

(Continued)

*Primary Examiner* — Jay P Patel

(57) ABSTRACT

Multicast traffic is expected to increase in packet networks, and therefore in switches and routers, by including broadcast and multimedia-on-demand services. Combined input-crosspoint buffered (CICB) switches can provide high performance under uniform multicast traffic. However this is often at the expense of $N^2$ crosspoint buffers. An output-based shared-memory crosspoint-buffered (O-SMCB) packet switch is used where the crosspoint buffers are shared by two outputs and use no speedup. An embodiment of the proposed switch provides high performance under admissible uniform and non-uniform multicast traffic models while using 50% of the memory used in CICB switches that has dedicated buffers. Furthermore, the O-SMCB switch provides higher throughput than an existing SMCB switch where the buffers are shared by inputs.

20 Claims, 1 Drawing Sheet

(56) References Cited

U.S. PATENT DOCUMENTS

| | | | |
|---|---|---|---|
| 7,742,486 B2* | 6/2010 | Nielsen et al. | 370/401 |
| 2004/0047334 A1* | 3/2004 | Francois et al. | 370/351 |
| 2004/0081184 A1 | 4/2004 | Magill et al. | |
| 2006/0018329 A1* | 1/2006 | Nielsen et al. | 370/401 |
| 2006/0077973 A1* | 4/2006 | Yoon et al. | 370/363 |
| 2007/0104195 A1* | 5/2007 | Tatapudi et al. | 370/390 |
| 2007/0104211 A1* | 5/2007 | Opsasnick | 370/412 |
| 2007/0140260 A1* | 6/2007 | Duxbury et al. | 370/395.41 |
| 2007/0223457 A1* | 9/2007 | Arikawa et al. | 370/352 |
| 2008/0013548 A1* | 1/2008 | Glaise et al. | 370/395.71 |
| 2008/0106951 A1* | 5/2008 | Olesinski et al. | 365/189.05 |
| 2008/0212577 A1* | 9/2008 | Abel et al. | 370/388 |
| 2011/0194450 A1* | 8/2011 | Tatapudi et al. | 370/252 |

OTHER PUBLICATIONS

Rojas-Cessa R et al., "CIXOB-k: Combined Input-Crosspoint-Output Buffered Packet Switch," Globecom'01, 2001 IEEE Global Telecommunications Conference, San Antonio, TX, Nov. 25-29, 2001, pp. 2654-2660.

T.T. Lee, "Nonblocking Copy Networks for Multicast Packet Switching", *IEEE J. Select. Areas Commun.*, 6, pp. 1455-1467, Dec. 1988.

M. Karol and M. Hluchyj, "Queueing in High-Performance Packet Switching", *IEEE J. Select. Areas Commun.*, 6, pp. 1587-1597, Dec. 1988.

Y. Doi and N. Yamanaka, "A High-Speed ATM Switch with Input and Cross-Point Buffers", *IEICE Trans. Commun.*, E76(3), pp. 310-314, Mar. 1993.

E. Oki, et al., "A 10-Gb/s (1.25 Gb/s × 8) 4 × 0.25-μ. CMOS/SIMOX ATM Switch Based on Scalable Distributed Arbitration," *IEEE J. Solid-State Circuits*, 34(12), pp. 1921-1934, Dec. 1999.

M. Nabeshima, "Performance Evaluation of a Combined Input- and Crosspoint-Queued Switch," *IEICE Trans. Commun.*, E83-B(3), pp. 737-741, Mar. 2000.

K. Yoshigoe and K.J. Christensen, "A Parallel-Polled Virtual Output Queue with a Buffered Crossbar," *Proceedings of IEEE HPSR 2001*, pp. 271-275, May 2001.

Rojas-Cessa, E. Oki, Z. Jing, and H. J. Chao, "CIXB-1: Combined Input-One-Cell-Crosspoint Buffered Switch," *Proc. IEEE Workshop on High Performance Switches and Routers 2001*, pp. 324-329, May 2001.

M. Hamdi and M. Lhamdi, "Scheduling Multicast Traffic in Internally Buffered Crossbar Switches," *Proc. IEEE International Conference on Communications 2004*, 2, pp. 1103-1107, Jun. 2004.

S. Sun, S. He, Y. Zheng, and W. Gao, "Multicast Scheduling in Buffered Crossbar Switches with Multiple input Queues," *Proc. IEEE Workshop on High Performance Switchesand Routers 2005*, 12(14), pp. 73-77, May 2005.

Z. Dong and R. Rojas-Cessa, "Long Round-Trip Time Support with Shared-Memory Crosspoint Buffered Packet Switch," *Proc. IEEE Hot Interconnects 2005*, pp. 138-143, Aug. 2005.

\* cited by examiner

REPLICATING AND SWITCHING MULTICAST INTERNET PACKETS IN ROUTERS USING CROSSPOINT MEMORY SHARED BY OUTPUT PORTS

CROSS-REFERENCE TO RELATED APPLICATIONS

The present application claims priority to U.S. Provisional Patent Application No. 60/967,175 filed Aug. 31, 2007, the contents of which are incorporated herein by reference.

STATEMENT OF FEDERALLY FUNDED RESEARCH

The present application includes research supported in part by the National Science Foundation (NSF) under Grant No. 0435250. The federal government may have certain rights in the present application.

FIELD

The present disclosure relates to the field of packet-oriented networks. The present disclosure provides a method for replicating and switching multicast Internet packets in routers using cross-point memory shared by output ports.

BACKGROUND

This background section provides a context for the disclosure. The description herein may include concepts that could be pursued but are not necessarily ones that have been previously conceived or pursued. The description is not intended to be limiting and unless otherwise stated, nothing in this section is admitted as prior art simply by inclusion in this section.

The migration of broadcasting services, such as cable television and multimedia-on-demand, to packet-oriented networks as well as the embracing of emerging applications, such as teleconferencing and storage networks by the Internet, place significant traffic demands on the Internet. To keep up with such bandwidth demand, packet switches and routers need to provide efficient multicast switching and packet replication.

The forwarding of packets in the Internet depends on the switching efficiency of routers and switches. Presently, there are different buffering strategies to build packet switches. Input buffered (IB) switches provide limited throughput and require complex scheduling schemes. Output buffered (OB) switches offer high throughput but require infeasible memory speedup. Combined input crosspoint buffered (CICB) switches deliver better switching performance than input buffered switches, but the memory amount in the buffered crossbar is large (the number of crosspoint buffers equals $N^2$, where N is the number of ports).

In addition to the high performance of CICB packet switches under unicast traffic, the crosspoint buffers in these switches help to provide call splitting intrinsically. Different from IB switches, CICB switches do not require cell transmission after inputs and outputs have been matched. In CICB switches, one input can send up to one (multicast) cell to the crossbar, and one or more cells destined to a single output port can be forwarded from multiple inputs to the crossbar at the same time slot. Therefore, CICB switches have natural properties favorable for multicast switching as contending copies for a single output can be sent to the crosspoint buffers from several inputs at the same time slot without blocking each other.

Existing packet switches mostly target unicast traffic. It is expected that in the near future multicast and broadcast services will demand most of the available bandwidth of the Internet. Current packet switches provide limited services for multicast traffic. CICB switches are seen as the promising architecture for building efficient switches. However, multicast packets can easily exhaust the available internal buffers in current CICB switches. Handling and management of multicast traffic by switches and routers can become very expensive as the sheer amount and speed of memory necessary often becomes cost prohibitive if not simply infeasible. To lower the cost of memory implementation, the required memory amount should be reduced or kept to a minimum while keeping high efficiency in packet switching and replication.

SUMMARY

Various embodiments relate to switch architecture and selection schemes for efficient replication and switching of multicast Internet packets. In at least one embodiment, switch buffered crosspoints are utilized to allow for sharing of memory by different outputs.

At least one embodiment is based on a CICB switch that uses crosspoint buffers shared by two or more output ports. Buffer sharing by two output ports is used to achieve high performance and simplify the implementation.

At least one embodiment includes a method of scheduling access to the shared crosspoint buffers by output ports and a flow control mechanism to avoid buffer underflow and overflow. The resulting switch architecture is referred to as shared-memory crosspoint-buffered switch with output-based sharing (O-SMCB).

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
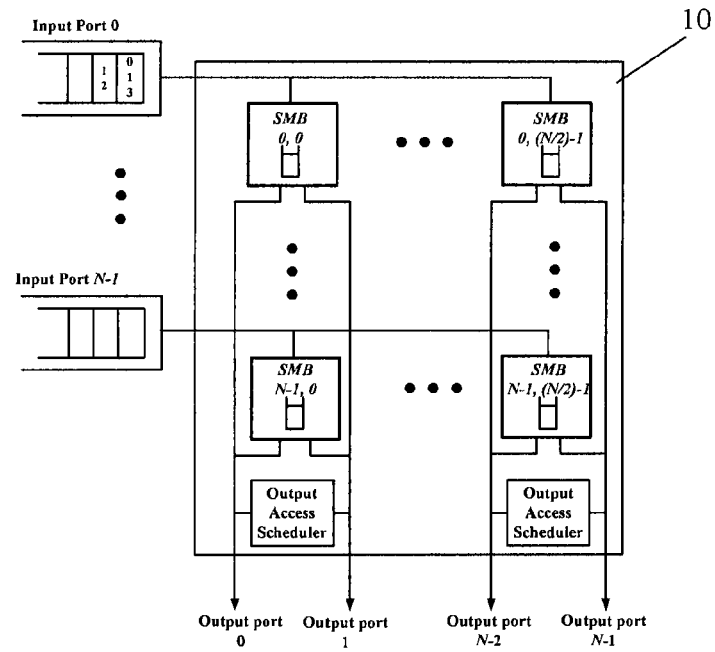
FIG. 1 is a schematic drawing of the N×N output-based shared-memory crosspoint buffered (O-SMCB) switch with shared-memory crosspoints by outputs.

FIG. 1 illustrates a representative output-based shared-memory crosspoint buffered (O-SMCB) switch 10. The O-SMCB switch 10 requires less memory than a CICB switch to achieve comparable performance under multicast traffic and no speedup. Furthermore, the O-SMCB switch provides higher throughput under uniform and non-uniform multicast traffic models than an input-based SMCB (I-SMCB) switch (FIG. 2), where two inputs share crosspoint buffers. The O-SMCB switch 10 includes input ports 0 to N-1; shared memory buffers (SMB); output access schedulers; and output ports 0, 1, . . . , N-2, and N-1. The input ports receive input from a first-in first-out (FIFO) queue at each input. The switch 10 has $N^2$ crosspoints and $N^2/2$ crosspoint buffers in the crossbar. A crosspoint in the buffered crossbar connects input port i to output j is denoted as CP(i,j). The buffer shared by CP(i,j) and CP(i, j') that stores cells for output ports j or j', where j≠j', is denoted as SMB (i,q), where $0 \leq q \leq N/2-1$.

According to at least one embodiment, the O-SMCB switch 10 uses round-robin selection in its arbitration schemes and achieves a high throughput under multicast traffic. This selection scheme was adopted for its simplicity and as an example. Other selection schemes can also be used. In another embodiment, the O-SMCB switch 10 is provisioned with one multicast first-in first-out (FIFO) queue at each input. For this embodiment, an even N value is assumed for the sake of clarity. However, an odd N value can be used with one input port using dedicated buffers of size 0.5 to 1.0 the size of an SMB. The size of an SMB, in number of cells that can be stored, is $k_s$. The case of minimum amount of memory, or when $k_s=1$ (equivalent to having 50% of the memory in the crossbar of a CICB switch), is considered. Therefore, SMB (i,q) with $k_s=1$ can store a cell that can be directed to either j or j'. The SMB has two egress lines, one per output.

To avoid the need for speedup at SMBs, only one output is allowed to access an SMB at a time. The access to one of the N SMBs by each output is decided by an output-access scheduler. A scheduler performs a match between SMBs and the outputs that share them by using round-robin selection. There are N/2 output-access schedulers in the buffered crossbar, one for each pair of outputs. Multicast cells at the inputs have an N-bit multicast bitmap to indicate the destination of the multicast cells. Each bit of the bitmap is denoted as $D_j$, where $$D_j = \begin{cases} 1 & \text{if output } j \text{ is one of the cell destination,} \\ 0 & \text{otherwise.} \end{cases}$$

Each time a multicast copy is forwarded to the SMB for the cell's destination, the corresponding bit in the bitmap is reset. When all bits of a multicast bitmap are zero, the multicast cell is considered completely served. Call splitting is used by this switch to allow effective replication and to alleviate a possible head-of-line blocking. A credit-based flow control mechanism is used to notify the inputs about which output replicates a multicast copy and to avoid buffer overflow.

Much research has focused on unicast traffic, where each packet has a single destination. It has been shown that unicast switches achieve 100% throughput under admissible conditions, $$\sum_i \lambda_{i,j} < 1 \text{ and } \sum_j \lambda_{i,j} < 1$$

where i is the index of inputs (0≤i≤N-1), j is the index of outputs (0≤i≤N-1) for an N×N port switch, and $\lambda_{i,j}$ is the data rate from input i to output j, in a plethora of switch architectures and switch configuration schemes.

Although it is difficult to describe actual multicast traffic models, switches of this type also should provide 100% throughput under admissible multicast traffic. In multicast switches, the admissibility conditions are similar to those for unicast traffic, however, with the consideration of the fanout of multicast packets. The fanout of a multicast packet is the number of different destinations that expect copies of the packet. This implies that the average fanout of multicast traffic increases the average output load of a switch. Therefore, the average output load in a multicast switch is proportional to the product of the average input load and the average fanout for a given multicast traffic model.

In at least one embodiment, incoming variable-size packets are segmented into fixed-length packets, also called cells, at the ingress side of a switch and being re-assembled at the egress side, before the packets leave the switch. Therefore, the time to transmit a cell from an input to an output takes a fixed amount of time, or time slot. Also, cell replication is performed at the switch fabric by exploiting its space capabilities. One embodiment focuses on crossbar-based switches in order to allow multicast cells to be stored in a single queue at the input.

Multicast switching has been largely considered for input buffered (IB) switches. In these switches, matching is performed between inputs and outputs to define the configuration on a time-slot basis. This matching process can be complex when considering multicast traffic. Combined input crosspoint-buffered (CICB) packet switches have higher performance than IB switches at the expense of having crosspoint buffers, which run at the same speed as the input buffers in an IB switch, under unicast traffic. In these switches, an input might have up to N buffers where each one stores cells destined to a particular output to avoid head-of-line blocking. The crosspoint buffers in CICB switches can be used to provide call splitting (or fanout splitting) intrinsically. Different from IB switches, CICB switches are not required to have cell transmission after inputs and output have been matched. This feature makes CICB switches attractive for implementation. In CICB switches, one input can send up to one (multicast) cell to the crossbar, and one or more cells destined to a single output port can be forwarded from multiple inputs to the crossbar at the same time slot.

Therefore, CICB switches have natural properties favorable for multicast switching as contending copies for a single output can be sent to the crosspoint buffers from several inputs at the same time slot without blocking each other. In general, CICB switches have dedicated crosspoint buffers for each input-output pair, for a total of $N^2$ crosspoint buffers. Since memory used in the crosspoint buffers has to be fast, it is desirable to minimize the total amount this fast, expensive memory.

Figure 2:
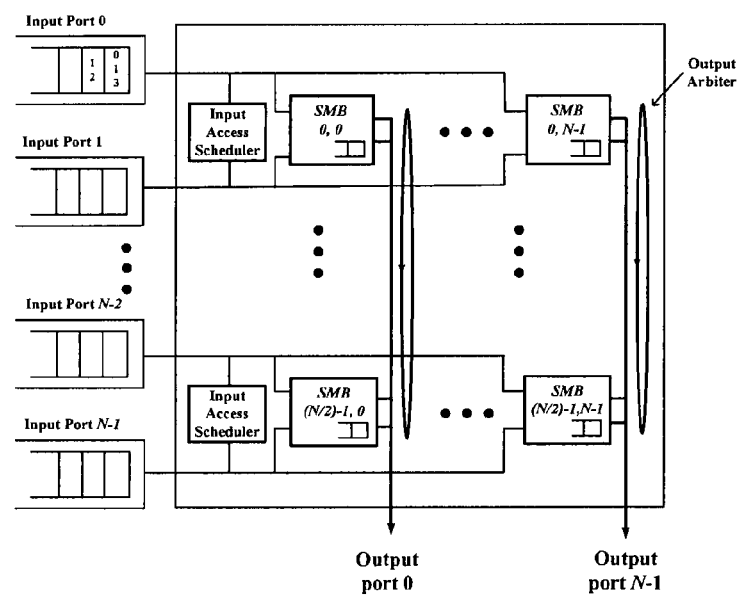
FIG. 2 is a schematic drawing of the N×N input-based shared-memory crosspoint buffered (I-SMCB) switch with shared-memory crosspoints by inputs.

FIG. 2 shows an I-SMCB switch. The performance of the O-SMCB switch described with reference to FIG. 1 is compared to that of the I-SMCB switch. Models of a 16×16 O-SMCB switch and a 16×16 I-SMCB switch can be implemented in discrete-event simulation programs. The I-SMCB switch has an architecture similar to the O-SMCB switch, in that the SMBs are shared by (two) inputs. For a fair comparison, the I-SMCB also uses round-robin selections for SMB-access by inputs and for output arbitration. Simulation results are obtained with a 95% confidence interval and a standard error not greater than 5%.

Multicast traffic models are considered with uniform and nonuniform distributions and Bernoulli arrivals: multicast uniform, multicast diagonal with fanouts of 2 and 4, and broadcast. In the uniform multicast traffic model, multicast cells are generated with a uniformly distributed fanout among N outputs. For this traffic model, the average fanout is $$\frac{1+N}{2} = \frac{17}{2}$$

and a maximum admissible input load of $$\frac{1}{fanout} = \frac{1}{8.5}.$$

The diagonal multicast traffic model with a fanout of 2 has a destination distribution to j=i and j=(i+1)%N for each multicast cell, and a maximum admissible input load of 0.5. The diagonal multicast traffic model with a fanout of 4 has the copies of a multicast cell destined to j={i, (i+1)%N, (i+2)%N, and (i+3)%N}$ for each multicast cell, and its admissible input load is 0.25. A broadcast multicast cell generates copies for all N different outputs and has a maximum admissible load is $\frac{1}{16}$=0.0625.

Under uniform traffic, the I-SMCB and O-SMCB switches deliver 100% throughput. Under multicast diagonal traffic with fanout of 2, the throughputs observed are 100% for the O-SMCB switch and 96% for the I-SMCB switch. Under multicast diagonal traffic with a fanout of 4, the performance of the I-SMCB switch decreases to 67%, while the performance of the O-SMCB switch remains high, close to 100%. Under broadcast traffic (fanout equal to N), the throughput of the O-SMCB switch is 99% while the throughput of the I-SMCB switch is 95%.

Multicast is a traffic type difficult to police for admissibility. Furthermore, the performance of switches under inadmissible traffic (produced by larger fanouts than the expected average) might change. In cases of unicast traffic, the maximum throughput of a switch can remain high with a fair scheduler. However, this might not be the case under multicast traffic. In this experiment, the input load is increased beyond the maximum admissible values in the considered traffic models to observe throughput changes of the O-SMCB and I-SMCB switches under these overload conditions.

Under uniform multicast traffic, the throughput of both switches degrades to 93% when the input load is larger than 0.117 (the output load is larger than 1.0). This throughput degradation occurs because of the increased number of contentions for SMB access as the traffic load increases. Under multicast diagonal traffic with fanout of 2, the throughput of the I-SMCB switch is reduced to 90% while the throughput of the O-SMCB switch remains close to 100%. Under multicast diagonal traffic with a fanout of 4, the throughput of the I-SMCB switch falls to 68% while the throughput of the O-SMCB switch also remains close to 100%. Under broadcast traffic, the throughput of the I-SMCB switch decreases to 79%. However, the throughput of the O-SMCB switch remains close to 100%.

TABLE I

| Traffic type | Ta(I) | Ta(O) | Ti(I) | Ti(O) |
|---|---|---|---|---|
| Uniform | 100% | 100% | 93% | 93% |
| Diagonal 2 | 96% | 100% | 90% | 100% |
| Diagonal 4 | 67% | 100% | 68% | 100% |
| Broadcast | 95% | 99% | 79% | 100% |

Table I summarizes the obtained throughput for all tested traffic models. In this table, Ta stands for the measured throughput under admissible traffic and Ti for the measured throughput under inadmissible traffic. The I in parenthesis indicates that the result is related to the I-SMCB switch and the O indicates that the result is related to the O-SMCB switch.

The embodiment described provides a switch architecture to support multicast traffic using a shared-memory switch that uses crosspoint buffers shared by outputs to use 50% of the memory amount in the crossbar fabric that CICB switches require. One embodiment of the proposed O-SMCB switch delivers high performance under multicast traffic while using no speedup. The switch has buffers that are shared by outputs instead of the inputs. This has the effect of facilitating call splitting by allowing inputs directly access to the crosspoint buffers.

This improvement has a significant impact on switching performance. As a result, the O-SMCB provides 100% throughput under both uniform multicast traffic and diagonal multicast traffic with fanouts of 2 and 4, all with Bernoulli arrivals. Furthermore, an embodiment of the proposed switch keeps the throughput high under nonuniform traffic with overloading conditions. The disadvantage of SMCB switches is that time relaxation of CICB switches is minimized because of the matching process considered. However, the matching is performed in chip and among a moderate number of outputs. Furthermore, the matching process is simpler in the SMCB switches than those used in IB switches for multicast traffic.

The representative method offers significant advantages relative to prior art. The advantageous properties and/or characteristics of the disclosed method include, but are not limited to, scalability, effectiveness, robustness, and efficiency.

The above-described embodiments may be implemented within the context of methods, computer readable media and computer program processes. As such, it is contemplated that some of the steps discussed herein as methods, algorithms and/or software processes may be implemented within hardware (e.g., circuitry that cooperates with a processor to perform various steps), software or a combination of hardware and software. The representative embodiments may be implemented as a computer program product wherein computer instructions, when processed by a computer, adapt the operation of the computer such that the methods and/or techniques are invoked or otherwise provided. Instructions for invoking the methods may be stored in fixed or removable media, transmitted via a data stream in a signal bearing medium such as a broadcast medium, and/or stored within a working memory or mass storage device associated with a computing device operating according to the instructions. Generally speaking, a computing device including a processor, memory and input/output means may be used to process software instructions, store software instructions and/or propagate software instructions to or from a communications channel, storage device or other computer/system.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

What is claimed is:

1. A switch that supports multi-cast traffic in a network, the switch comprising:
   input ports configured to receive data packets;
   output ports configured to provide data packets to the network;
   crosspoint memory buffers coupling the input ports and the output ports, wherein each crosspoint memory buffer comprises a queue that is exclusively dedicated to two of the output ports, and wherein the queue comprises data for each of the two output ports; and
   at least one scheduler that matches crosspoint memory buffers and output ports.

2. The switch of claim 1, wherein the data packets received by the input ports are variable size data packets.

3. The switch of claim 1, wherein there are N/2 schedulers where N is a number of output ports.

4. The switch of claim 1, wherein there are $N^2/2$ crosspoint memory buffers where N is a number of output ports.

5. The switch of claim 1, wherein the received data packets have a multi-cast fanout number of 2.

6. The switch of claim 1, wherein the received data packets are uniform multicast traffic data packets.

7. A method of replicating and switching multicast network packets using cross-point memory shared by output ports, the method comprising:

segmenting incoming variable-size packets into fixed length packets at an ingress side of a switch;

matching shared memory buffers and output ports, wherein each shared memory buffer comprises a queue that is exclusively dedicated to two of the output ports, and wherein the queue comprises data for each of the two output ports; and re-assembling the fixed-length packets into outgoing variable-size packets at an egress side of the switch.

8. The method of claim 7, wherein the incoming variable-size packets have a multi-cast fanout number of 4.

9. The method of claim 7, wherein matching shared memory buffers and output ports is done using a round-robin selection process.

10. The method of claim 7, further comprising scheduling access to shared memory buffers by output ports such that only one output port accesses a particular crosspoint memory buffer at a time.

11. The method of claim 7, further comprising providing call splitting with the incoming variable-size packets.

12. The method of claim 7, wherein multicast cells at the ingress side of the switch have an N-bit multicast bitmap to indicate a destination of the multicast cells.

13. The method of claim 12, wherein each bit of the N-bit bitmap is denoted as $D_j$, where $D_j=\{1$ if output j is one of the cell destination, 0 otherwise.

14. A non-transitory computer-readable medium having computer-readable instructions stored thereon, the instructions comprising:

instructions for segmenting incoming variable-size packets into fixed length packets at an ingress side of a switch;

instructions for matching shared memory buffers and output ports for communication of fixed length packets, wherein each shared memory buffer comprises a queue that is exclusively dedicated to two of the output ports, and wherein the queue comprises data for each of the two output ports; and instructions for reassembling the fixed-length packets into outgoing variable-size packets at an egress side of the switch.

15. The non-transitory computer-readable medium of claim 14, wherein the instructions further comprise instructions for matching shared memory buffers and output ports using a round-robin selection process.

16. The non-transitory computer-readable medium of claim 14, wherein there are $N^2/2$ shared memory buffers where N is a number of output ports.

17. The non-transitory computer-readable medium of claim 16, wherein N is an even number.

18. The non-transitory computer-readable medium of claim 14, wherein multicast cells are segmented at the ingress side.

19. The non-transitory computer-readable medium of claim 18, wherein multicast cells at the ingress side of the switch have an N-bit multicast bitmap to indicate a destination of the multicast cells, and wherein each bit of the N-bit bitmap is denoted as $D_j$, where $D_j=\{1$ if output j is one of the cell destination, 0 otherwise.

20. The non-transitory computer-readable medium of claim 19, wherein each time a multicast copy is sent to a particular shared memory buffer, a corresponding bit in the N-bit bitmap is reset.

\* \* \* \* \*

UNITED STATES PATENT AND TRADEMARK OFFICE
CERTIFICATE OF CORRECTION

PATENT NO. : 8,861,539 B2
APPLICATION NO. : 12/201604
DATED : October 14, 2014
INVENTOR(S) : Ziqian Dong and Roberto Rojas-Cessa It is certified that error appears in the above-identified patent and that said Letters Patent is hereby corrected as shown below:

In the Specification:

In Column 1, line 18 delete "may have" and insert --has--.

Signed and Sealed this
Twenty-second Day of September, 2015

Michelle K. Lee
*Director of the United States Patent and Trademark Office*